United States Patent [19]

Rieger et al.

[11] Patent Number: 5,132,262

[45] Date of Patent: Jul. 21, 1992

[54] SOLUBLE CATALYST SYSTEMS FOR THE POLYMERIZATION OF $C_2$- TO $C_{10}$-ALK-L-ENES

[75] Inventors: Bernhard Rieger, Ludwigshafen, Fed. Rep. of Germany; Hans Brintzinger, Taegerwilen, Switzerland; Werner Roell, Constance, Fed. Rep. of Germany; Annette Reinmuth, Constance, Fed. Rep. of Germany; Elke Barsties, Constance, Fed. Rep. of Germany

[73] Assignee: BASF Aktiengesellschaft, Ludwigshafen, Fed. Rep. of Germany

[21] Appl. No.: 653,546

[22] Filed: Feb. 11, 1991

[30] Foreign Application Priority Data

Feb. 26, 1990 [DE] Fed. Rep. of Germany ....... 4005947

[51] Int. Cl.⁵ .............................. C08F 4/64; C08F 4/68
[52] U.S. Cl. .................................... 502/117; 502/103; 526/160
[58] Field of Search ................................ 502/103, 117

[56] References Cited

U.S. PATENT DOCUMENTS

| | | | |
|---|---|---|---|
| 4,769,510 | 9/1988 | Kaminsky et al. | 585/512 |
| 4,794,096 | 12/1988 | Ewen | 502/117 |
| 4,871,705 | 10/1989 | Hoel | 502/117 |
| 4,931,417 | 6/1990 | Miya et al. | 502/117 |
| 5,017,714 | 5/1991 | Welborn | 502/117 X |

FOREIGN PATENT DOCUMENTS

| | | |
|---|---|---|
| 185918 | 7/1986 | European Pat. Off. . |
| 283739 | 9/1988 | European Pat. Off. . |
| 284708 | 10/1988 | European Pat. Off. . |
| 316155 | 5/1989 | European Pat. Off. . |
| 336127 | 10/1989 | European Pat. Off. . |
| 336128 | 10/1989 | European Pat. Off. . |
| 0347128 | 12/1989 | European Pat. Off. . |
| 3826075 | 2/1990 | Fed. Rep. of Germany . |
| 89-1801 | 3/1989 | South Africa . |
| 89-1802 | 3/1989 | South Africa . |
| 89-5769 | 7/1989 | South Africa . |
| 2207136 | 1/1989 | United Kingdom . |

OTHER PUBLICATIONS

Journal of Organometallic Chemistry, 369 (1989) 359–370.

Primary Examiner—Patrick P. Garvin
Attorney, Agent, or Firm—Keil & Weinkauf

[57] ABSTRACT

The present invention relates to soluble catalyst systems for the polymerization of $C_2$- to $C_{10}$-alk-l-enes, containing, as active constituents,
a) a metallocene complex of the general formula I

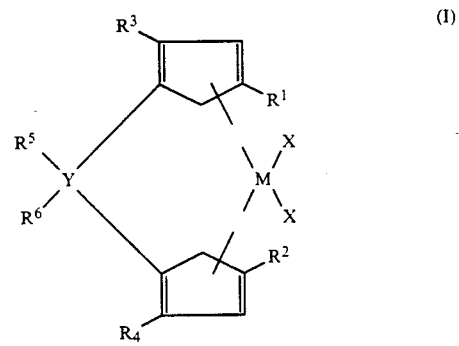

where
$R^1$ and $R^2$ are branched $C_4$- to $C_{10}$-alkyl, 5- to 7-membered cycloalkyl, which may itself be substituted by $C_1$- to $C_6$-alkyl, or are $C_6$- to $C_{15}$-aryl or aralkyl;
$R^3$ to $R^6$ are $C_1$- to $C_8$-alkyl,
M is titanium, zirconium, hafnium or vanadium,
Y is silicon or germanium, and
X is halogen or $C_1$- to $C_8$-alkyl,
b) and an open-chain or cyclic aluminoxane compound of the general formula II or III

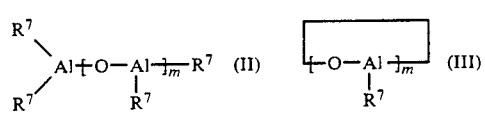

where $R^7$ is $C_1$–$C_4$-alkyl, and m is from 5 to 30.

These catalyst systems are particularly suitable for the preparation of polypropylene and copolymers of propylene with lesser amounts of other $C_2$- to $C_{10}$-alky-l-enes.

7 Claims, No Drawings

SOLUBLE CATALYST SYSTEMS FOR THE POLYMERIZATION OF $C_2$- TO $C_{10}$-ALK-L-ENES

The present invention relates to soluble catalyst systems for the polymerization of $C_2$- to $C_{10}$-alk-1-enes, containing, as active constituents, a) a metallocene complex of the general formula I

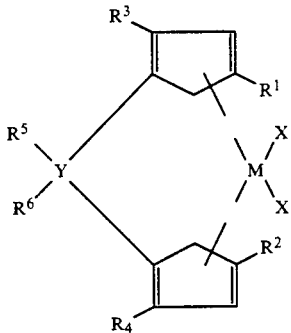

where
- $R^1$ and $R^2$ are branched $C_4$- to $C_{10}$-alkyl, 5- to 7-membered cycloalkyl, which may itself be substituted by $C_1$- to $C_6$-alkyl, or are $C_6$- to $C_{15}$-aryl or aralkyl;
- $R^3$ to $R^6$ are $C_1$- to $C_8$-alkyl,
- M is titanium, zirconium, hafnium or vanadium,
- Y is silicon or germanium, and
- X is halogen or $C_1$- to $C_8$-alkyl, b) and an open-chain or cyclic aluminoxane compound of the general formula II or III

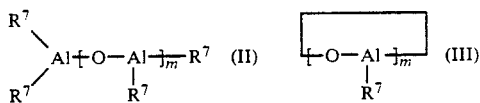

where $R^7$ is $C_1$-$C_4$-alkyl, and m is from 5 to 30.

The present invention furthermore relates to the preparation of polymers of propylene using these catalyst systems, to the polymers obtainable by this process, and to films and moldings made from these polymers.

The polymerization of alk-1-enes can be catalyzed either by insoluble Ziegler-Natta catalysts or by soluble catalyst systems. The latter comprise complex compounds of metals from sub-group IV or V of the periodic table with organic ligands, which are used in combination with oligomeric aluminum compounds (EP-A 185 918, EP-A 283 739 and GB-A 2,207,136). The complex compounds used in these catalyst systems usually contain, as organic ligands, cyclopentadienyl groups, which form $\pi$ bonds with the transition metal. Frequently used catalysts are also transition metal complexes which, in addition to organic ligands, contain halogens bonded to the metal atom.

EP-A 284 708 and 316 155 and U.S. Pat. No. 4,794,096 describe soluble catalyst systems for the polymerization of alk-1-enes in which the complex compounds used are bis(cyclopentadienyl) complexes of metals from sub-group IV of the periodic table, the two cyclopentadienyl rings being linked by an alkyl-substituted silicon or germanium atom. It is also possible to use transition metal complexes in which the cyclopentadienyl rings are substituted by alkyl groups and which contain, as further ligands, two halogens bonded to the transition metal. The oligomeric aluminum compounds used here are preferably linear or cyclic aluminoxane compounds of the general formula II or III.

Catalyst systems of this type can be used to give polymers of propylene which have, amongst other properties, a relatively narrow molecular weight distribution. In contrast to polypropylene prepared using insoluble Ziegler-Natta catalysts, the melting point of these polymers is in some cases considerably below 160° C.; this low thermal stability means that they are of limited suitability for certain areas of application.

It is an object of the present invention to overcome this disadvantage and to develop an improved soluble catalyst system which allows the preparation of polyalk-1-enes having a broad range of applications.

We have found that this object is achieved by the soluble catalyst systems defined at the outset.

In the catalyst systems according to the invention, metallocene complexes of the general formula I are used where $R^1$ and $R^2$ are preferably branched $C_4$- to $C_{10}$-alkyl, in particular tert-butyl, tert-pentyl, tert-hexyl, tert-heptyl or tert-octyl, and $R^3$, $R^4$, $R^5$ and $R^6$ are preferably $C_1$-$C_4$-alkyl, in particular methyl or ethyl. These branched substituents are bulky radicals which, unexpectedly, result in an increase in the stereospecificity, i.e. the isotacticity, of the resultant polymers.

Suitable central atoms are titanium, zirconium, hafnium and vanadium, preference being given to zirconium. The metallocene complex also contains a bridging member between the cyclopentadienyl rings, where Y is preferably silicon. In addition, the metallocene complex contains a substituent X, which can be fluorine, chlorine, bromine, iodine or $C_1$- to $C_8$-alkyl, for example methyl, ethyl, propyl or butyl. Preference is given to chlorine.

Examples of particularly preferred metal complexes are, inter alia, dimethylsilanediylbis(3-tert.butyl-5-methylcyclopentadienyl)zirconium dichloride,
diethylsilanediylbis(3-tert.butyl-5-methylcyclopentadienyl)zirconium dichloride,
methylethylsilanediylbis(3-tert.butyl-5-methylcyclopentadienyl)zirconium dichloride,
dimethylsilanediylbis(3-tert.butyl-5-ethylcyclopentadienyl)zirconium dichloride,
dimethylsilanediylbis(3-tert.pentyl-5-methylcyclopentadienyl)zirconium dichloride and
dimethylsilanediylbis(3-tert.butyl-5-methylcyclopentadienyl)dimethylzirconium.

Complexes of this type can be synthesized by conventional methods, preference being given to reacting the appropriate substituted cyclopentadienyl anions with halides of titanium, zirconium, hafnium or vanadium. Examples of appropriate preparation processes are described, inter alia, in Journal of Organometallic Chemistry, 369 (1989), 359-370.

In addition to the metallocene complex, the catalyst system according to the invention also contains linear or cyclic aluminoxane compounds of the general formula II or III

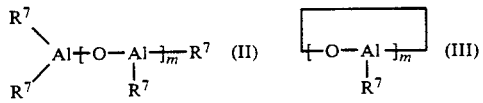

where $R^7$ is preferably methyl or ethyl, and m is preferably from 10 to 25.

These aluminoxane compounds are usually prepared by reacting a solution of trialkylaluminum with water; the preparation is described, inter alia, in EP-A 284 708 and U.S. Pat. No. 4,794,096.

In general, the resultant aluminoxanes are mixtures of linear and cyclic chain molecules of different lengths, and m should therefore be regarded as a mean.

In the polymerization of alk-1-enes using the catalyst system according to the invention, it is advantageous to use the metallocene complex a) and the aluminoxane compound b) in such amounts that the atomic ratio between aluminum from the aluminoxane b) and the transition metal from the metallocene complex a) is in the range from 10:1 to $10^6$:1, in particular from 10:1 to $10^4$:1. The two catalyst constituents can be introduced into the polymerization reactor in any desired sequence, either individually or as a mixture.

These soluble catalyst systems can be used to prepare polymers of alk-1-enes, which, for the purposes of the present invention, are homopolymers and copolymers of $C_2$- to $C_{10}$-alk-1-enes, preferred monomers being ethylene, propylene, but-1-ene, pent-1-ene and hex-1-ene. The catalyst systems according to the invention are particularly suitable for the preparation of polypropylene and of copolymers of propylene with lesser amounts of other $C_2$- to $C_{10}$-alk-1-enes, in particular for the preparation of copolymers of ethylene and but-1-ene.

The preparation of these polymers can be carried out either batchwise or preferably continuously in conventional reactors used for the polymerization of alk-1-enes. Suitable reactors are, inter alia, continuously operated stirred reactors, it also being possible to use, if desired, a series of consecutive stirred reactors.

The polymerization is carried out at 0.1 to 100 bar and at from $-50°$ to $150°$ C., preferably at from 0.5 to 10 bar and at from $-50°$ to $+100°$ C.

Polymerization reactions using the catalyst systems according to the invention can be carried out in the gas phase, in liquid monomers and in inert solvents. Preference is given to the polymerization in solvents, in particular in liquid hydrocarbons, such as benzene or toluene. In this case, it is advantageous to use from $10^{-4}$ to $10^{-1}$ mol of aluminum as aluminoxane per liter of the solvent.

The mean molecular weight of the polymers formed can be controlled by conventional methods of polymerization technology, for example by adding regulators, such as hydrogen, or by modifying the reaction temperature. A reduction in the reaction temperature allows polymers of increased mean molecular weight to be prepared.

The polymers prepared using the catalyst system according to the invention have an increased melting point, a relatively narrow molecular weight distribution and a high degree of stereospecificity (high proportion of isotactic molecular structures).

These properties make them particularly suitable for the production of films, tubes, coatings, fibers, hollow articles, injection-molded articles and moldings for automobile construction.

EXAMPLES 1 TO 3

350 ml of dry toluene were introduced into a stirred autoclave with an effective capacity of 1 liter, and a solution of 0.45 g of methylaluminoxane (mean chain length m 20) in 30 ml of toluene was then added. $7.6 \cdot 10^{-3}$ mol of aluminum were used per liter of solvent. A solution of $25.3 \cdot 10^{-6}$ s mol of dimethylsilanediylbis(3-tert-butyl-5-methylcyclopentadienyl)zirconium dichloride (for preparation, see Journal of Organometallic Chemistry, 369 [1989], 359-370) in 20 ml of toluene was then added, so that the atomic ratio between aluminum and zirconium was 300:1. This mixture was first stirred for 30 minutes, and propylene was subsequently injected at a pressure of 2 bar, and the mixture was polymerized at constant pressure. The reaction temperatures for each of the 3 examples are given in the table below. After a reaction duration of 60 minutes, the unreacted propylene was removed, and a mixture of 1 1 of methanol and 10 ml of concentrated hydrochloric acid was then added to the reaction mixture. The precipitated polymer was filtered off, washed with methanol and dried under reduced pressure.

The amount of polypropylenes obtained in the three examples and their mean molecular weights, molecular weight distributions (weight average $\overline{M}w$ per number average $\overline{M}n$), melting points and isotacticities are given in the table below, together with the respective productivities of the catalyst system (g of polypropylene produced per g of zirconium employed).

COMPARATIVE EXPERIMENTS A AND B

Propylene was polymerized under the conditions of Examples 1 to 3, but the metallocene complex used was dimethylsilanediylbis(3-tert-butylcyclopentadienyl)zirconium dichloride. The reaction temperatures for each of Comparative Experiments A and B are given in the table below together with the amounts of polypropylenes obtained, their mean molecular weights, molecular weight distributions, melting points and isotacticities, and the respective productivities of the catalyst system.

COMPARATIVE EXPERIMENTS C AND D

Propylene was polymerized under the conditions of Examples 1 to 3, but the metal complex used was dimethylsilanediylbis(3-isopropyl-5-methylcyclopentadienyl)zirconium dichloride. The reaction temperatures for each of Comparative Experiments C and D are given in the table below, together with the amounts of polypropylenes obtained, their mean molecular weights, molecular weight distributions, melting points and isotacticities, and the respective productivities of the catalyst system.

A comparison of Examples 1-3 and Comparative Experiments A-D shows that it is possible, using the catalyst system according to the invention, to prepare polypropylene which has high isotacticity, a narrow molecular weight distribution and an increased melting point.

TABLE

| | Polymerization temperature [°C.] | Amount of polypropylene obtained [g] | Weight average [Mw] | Number average [Mn] | $\dfrac{\overline{M}w}{\overline{M}n}$ | Tacticity [in %] | Melting point [°C.] | Productivity [g of polypropylene/g of zirconium] |
|---|---|---|---|---|---|---|---|---|
| Examples | | | | | | | | |

| | Polymerization temperature [°C] | Amount of polypropylene obtained [g] | Weight average [Mw] | Number average [Mn] | $\overline{Mw}/\overline{Mn}$ | Tacticity [in %] | Melting point [°C] | Productivity [g of polypropylene/g of zirconium] |
|---|---|---|---|---|---|---|---|---|
| 1 | 0 | 0.69 | 113,000 | 49,000 | 2.31 | 98 | 163 | 300 |
| 2 | 25 | 2.77 | 44,000 | 21,000 | 2.10 | 97 | 162 | 1,200 |
| 3 | 50 | 11.54 | 9,500 | 3,600 | 2.65 | 93 | 149 | 5,000 |
| Comparative Experiments | | | | | | | | |
| A | 0 | 1.15 | 71,000 | 36,000 | 1.97 | 95 | 153 | 500 |
| B | 50 | 18.00 | 2,000 | 800 | 2.50 | 74 | 128 | 7,800 |
| C | 0 | 0.92 | 106,000 | 65,600 | 1.62 | 73 | 157 | 400 |
| D | 60 | 152.10 | 8,800 | 1,800 | 4.89 | 34 | 65 | 65,900 |

The isotacticity of the polypropylenes obtained was determined using a Bruker $^{13}$C-NMR spectrometer at 145° C. with 1,2-dichlorotetradeuteroethane as solvent. The ratio between isotactic, i.e. stereospecific, molecular structures and nonisotactic molecular structures, which each have different signals in the nuclear magnetic resonance spectrum, was determined.

We claim:

1. A catalyst system for the polymerization of $C_2$- to $C_{10}$-alk-1-enes, containing, as active constituents,
   a) a metallocene complex of the formula I

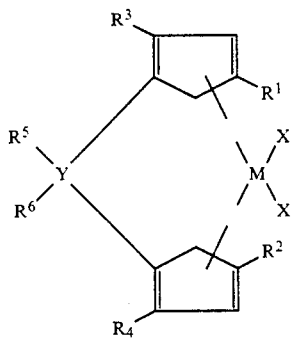

where
$R^1$ and $R^2$ are branched $C_4$- to $C_{10}$-alkyl
$R^3$ to $R^6$ are $C_1$- to $C_8$-alkyl,
M is titanium, zirconium, hafnium or vanadium,
Y is silicon or germanium, and
X is halogen or $C_1$ to $C_8$-alkyl,
   b) and an open-chain or cyclic aluminoxane compound of the formula II or III

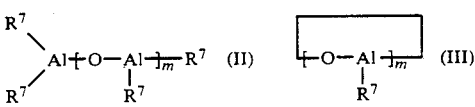

where $R^7$ is $C_1$–$C_4$-alkyl, and m is from 5 to 30.

2. A catalyst system as defined in claim 1, where $R^1$ and $R^2$ are branched $C_4$- to $C_{10}$-alkyl, selected from the group consisting of tert.-butyl, tert.-pentyl, tert.-hexyl, tert.-heptyl and tert.-octyl.

3. A catalyst system as defined in claim 1, where $R^3$, $R^4$, $R^5$ and $R^6$ are $C_1$- to $C_4$-alkyl.

4. A catalyst system as defined in claim 1, where X is chlorine.

5. A catalyst system as defined in claim 1, where M is zirconium.

6. A catalyst system as defined in claim 1, where Y is silicon.

7. A catalyst system as defined in claim 1, where the metallocene complex a) and the aluminoxane compound b) are used in such amounts that the atomic ratio between aluminum from the aluminoxane b) and the transition metal from the metallocene complex a) is in the range from 10:1 to $10^6$:1.

* * * * *

UNITED STATES PATENT AND TRADEMARK OFFICE
CERTIFICATE OF CORRECTION

PATENT NO. : 5,132,262

DATED : July 21, 1992

INVENTOR(S) : Bernhard RIEGER et al.

It is certified that error appears in the above-identified patent and that said Letters Patent is hereby corrected as shown below:

On the title page, Item [75]:
under Inventors: all instances of "Constance" should read
-- Konstanz -- in the Abstract, bottom line: "$C_{10}$-alky-1-enes" should read
-- $C_{10}$-alk-1-enes --

Signed and Sealed this

Twelfth Day of October, 1993

Attest:

BRUCE LEHMAN

Attesting Officer

Commissioner of Patents and Trademarks